United States Patent [19]

Davis

[11] 4,116,905

[45] Sep. 26, 1978

[54] WATER-BASED COATING COMPOSITION CONTAINING POLYVINYL CHLORIDE

[75] Inventor: Kenneth G. Davis, Pittsburgh, Pa.

[73] Assignee: Mobil Oil Corporation, New York, N.Y.

[21] Appl. No.: 782,201

[22] Filed: Mar. 28, 1977

Related U.S. Application Data

[63] Continuation-in-part of Ser. No. 585,938, Jun. 11, 1975, abandoned.

[51] Int. Cl.$^2$ .................... C08K 3/18; C08L 27/06; C08L 67/08
[52] U.S. Cl. ..................... 260/22 CB; 106/219; 260/27 R; 260/29.3; 260/29.4 UA; 260/29.6 NR; 260/29.6 RB; 428/418; 428/461
[58] Field of Search ....... 260/29.3, 29.2 EP, 29.6 RB, 260/29.6 NR, 29.4 UA, 27 R, 22 CB, 884; 427/195

[56] References Cited

U.S. PATENT DOCUMENTS

| | | | |
|---|---|---|---|
| 2,548,318 | 4/1951 | Norris | 260/34.2 |
| 2,686,736 | 8/1954 | Kuhn | 117/38 |
| 2,873,212 | 2/1959 | Roeser | 260/33.2 R |
| 2,902,459 | 9/1959 | Teppeman | 260/29.3 |
| 3,305,505 | 2/1967 | Ropp | 260/29.6 RB |
| 3,563,929 | 2/1971 | Guldenpfennig | 260/23 |
| 3,895,167 | 7/1975 | Gor | 260/29.4 UA |

*Primary Examiner*—Theodore E. Pertilla
*Attorney, Agent, or Firm*—Charles A. Huggett; Hastings S. Trigg

[57] ABSTRACT

A water-based coating composition is provided that is suitable for food packaging, such as in coating metal containers. The composition comprises a water-dilutable resin, solubilized with ammonia or an amine, dissolved in water or mixtures of water and an alcohol or an ether alcohol into which is dispersed polyvinyl chloride.

11 Claims, No Drawings

WATER-BASED COATING COMPOSITION CONTAINING POLYVINYL CHLORIDE

CROSS-REFERENCE TO RELATED APPLICATIONS

This application is a continuation-in-part of copending application Ser. No. 585,938, filed June 11, 1975 now abandoned.

BACKGROUND OF THE INVENTION

1. Field of the Invention

This invention is concerned with water-based coating compositions containing polyvinyl chloride.

2. Description of the Prior Art

Vinyl resins have been used extensively in the packaging industry because of their desirable properties of hardness, flexibility, product resistance, water resistance, and freedom from taste. Such resins are applied as solutions in organic solvents, which have to be removed, e.g., by evaporation into the air. Because, however, of air pollution regulations and standards, it has become desirable to use water as at least the major portion of the volatile vehicle.

Most vinyl polymers, particularly polyvinyl chloride, do not have functional groups on the polymer that can react with a solubilizing agent such as ammonia or an amine to convert the resin into a water-soluble material. It has been proposed to apply PVC as a hydrosol, i.e., PVC dispersed in water by use of wetting agents (surfactants). Films from such hydrosols have poor water resistance, probably because the wetting agent remains in the dried film and causes poor performance.

In U.S. Pat. No. 3,305,505, it is taught to fortify a resin latex with an amine or ammonium salt of a copolymer of the resin and meleic anhydride. The patentee specifically teaches that interpolymers of maleic anhydride with monomers differing from those of the latex will not fortify the latex.

It is the discovery of this invention that PVC can be dispersed in solution of a water-dilutable resin other than vinyl chloride-maleic anhydride solubilized with ammonia, NH$_4$OH or an amine, the solvent being water or a mixture of water and an alcohol or ether alcohol. When applied to a substrate and dried there is obtained a film suitable for packaging applications.

SUMMARY OF THE INVENTION

This invention provides a water-based coating formulation that comprises powdered polyvinyl chloride dispersed in a solution of a water-dilutable resin, water-solubilized with ammonia, NH$_4$OH or an amine, in water or a mixture of water and an alcohol or ether alcohol.

It also provides substrates coated with such coating formulation.

DESCRIPTION OF SPECIFIC EMBODIMENTS

In preparing the coating formulas of this invention there is first prepared a solution of water-dilutable resin in an aqueous vehicle. To this solution there is added polyvinylchloride in powder form so that it is dispersed in the aqueous solution.

The water-dilutable resin will be any resin or mixture of resins having a functional group, such as carboxyl or hydroxy, that will react with a solubilizing agent, such as ammonia or an amine. A wide variety of such resins have been found utilizable and most are well known in the art and commercially available.

Typical types of water-dilutable resins include:

Acrylic resins, both thermoplastic and thermosetting. Such resins include copolymers of acrylic acid or methacrylic acid with acrylate and methacrylate resins, polyacrylic acid, polymethacrylic acid and polyglycidyl methacrylate.

Alkyd resins both oil modified and oil-free. Typical alkyds are prepared from polyesterifying dicarboxylic acids, such as phthalic anhydride, maleic anhydride, succinic anhydride, adipic acid and sebacic acid wth polyalcohols such as glycerol, glycols, pentaerythritol and sorbitol. These are oil modified with fatty substances such as oleic acid.

Epoxy resins having an epoxy equivalent weight of 175-200.

Blends of alkyd resins and phenolic resins. These include blends of the aforedescribed alkyd resins with phenolic resins, such as phenol-formaldehyde resins.

Amino resins, i.e., the well known aminoplasts having hydroxyl functionality. Typical resins include urea or melamine-formaldehyde resins, hexamethoxymethylmelamine, benzoguanamine-formaldehyde resin, and butylated urea or melamine-formaldehyde resins.

Oleoresins, i.e., natural resins containing carboxyl funcitionality. These include such natural resins as the Dammars, East India Copals, Mastic and Sandarac. Typical natural resins and their properties are set forth in "Natural Resins Handbook" American Gum Importers Association, Brooklyn (1939).

Polyesters — These include polyesters having carboxyl functionality prepared from glycols or other polyols with polycarboxylic acids such as phthalic acid, fumaric acid, cyanuric acid, and trimilletic anhydride.

The water-dilutable resin is solubilized with ammonia, NH$_4$OH or amines such as lower alkyl and/or alkylol amines. Typical amines include dimethylamine, trimethylamine, ethylamine, diethylamin, triethylamine, propylamine, dipropylamine, triisopropylamine, ethanolamine, isopropanolamine, dipropanolamine and dimethylethanolamine.

The solvent or vehicle used in the formulations of this invention are water or mixtures of water and an alcohol or ether alcohol or mixtures of water, alcohol and ether alcohol. Utilizable alcohols incude methanol, ethanol, n-propanol, isopropanol, n-butanol, isobutanol and t-butanol. The ether alcohols include methoxyethanol, ethoxyethanol, butoxyethanol and hexoxyethanol. The amount of alcohol and.or ether alcohol will be between about 5 and about 30 wt. % of the total solvent mixture.

The preferred vinyl polymer, because of wide availability and acceptability is polyvinylchloride. The polyvinylchloride is a dispersion resin available in finely divided powder form. In general, the particle size will be such as to pass a 40 mesh sieve and will be retaned on 200 mesh sieve (U.S. sieve series). Copiolymers of vinyl chloride and other monomers, such as vinyl acetate, are contemplated. Such copolymes are well known in the art and will contain up to about 10% comonomer.

The weight ratio of PVC to water-dilutable resin will be between about 15:1 and about 1:1, preferably between about 10:1 and about 1:1. The total solids content in the finished coating (PVC + water-dilutable resin) will be between about 15 and about 65 wt. %.

The coating formulation is prepared by adding the PVC powder to the solution of water-dilutable resin with stirring. Alternatively the PVC powder may be combined with the water dilutable resin or resins prior to neutralization and water addition. The resultant formulation is a suspension of PVC particules in the solution. Typical techniques for preparing the PVC suspension coating formulation are set forth in the following examples. All parts in this specification and claims are by weight percent.

EXAMPLE 1

In a mixing vessel were placed 20.97 parts of an alkyd resin preapred from tall oil fatty acids, isophthalic acid, dimethylolpropane and trimelltic anhydride (75 wt. % solids in butoxyethanol-Acid No. about 10), 1.89 parts of n-butyl alcohol, and 0.29 parts of butoxyethanol (butyl Cellosolve). This mixutre was stirred at room temperature unitl uniform. While continuing agitation, there was added 1.54 parts of dimethylethanolamine until uniform. Then, 23.85 parts of deionized water was slowly added to obtain an aqueous solution of the alkyd resin.

Agitation was increased to a high rate and 39.27 parts of powdered polyvinyl chloride were added and stirring continued until a fineness of grind of greater than 4¾ is obtained as measured on a North Standard Gauge. Care was taken that the temperature did not exceed 140° F. Thereafter, another 12.2 parts of deionized water was added under normal (slow) agitation and the suspension was stirred to afford the final product. Solids content was 55 percent. Viscosity was 90–115 sec., No. 4 Ford Cup.

The coating formulations of this invention can be applied to substrates, such as paper, metal foil, can stock metals. Suitable metals include aluminum, steel, and tinplated steel. The coating can be applied by spray coat, direct or reverse roll coat, flow coat, or gravure coat. After application, the coating is baked for between about 5 seconds and about 10 minutes at between about 375° F. and about 750° F.

ADHESION TEST

A baked coated area on the test panel is cross-hatched with individual score lines about 1/16 inch apart. Then, Scotch tape in firmly applied to the cross-hatched area and removed with a quick snap. The amount of coating remaining on the substrate is observed visually and rated on a scale of 0–10, with 10 being perfect, i.e., no coating was pulled off with the tape.

Pasteurization is carried out by immersing the coated panel in water at 155° F. for 30 minutes. Then, the panel is wiped dry with an absorbent towel and the adhesion test is carried out as aforedescribed. Blush, i.e., clouding of the film is rated on a 0 to 10 scale with 10 representing no blush. In a more severe test, pasteurization can be carried out at 170° F. for 45 minutes.

EXAMPLE 2

The dispersion coating formulation of Example 1 was applied to aluminum test panels and to tinplated steel test panels 9–10 mils thick. Application was by roll coat at film weights of 4–10 mg./sq. in. and the coated panels were baked 10 minutes at 400° F. The baked panels were tested for adhesion. Pertinent results are set forth in the Table.

TABLE

| Aluminum | Composition of Example 1 |
|---|---|
| Dry Adhesion | 10 |
| Pasteurized: | |
| Adhesion | 10 |
| Blush | 9 |
| Tinplate | |
| Dry Adhesion | 10 |
| Pasteurized: | |
| Adhesion | 10 |
| Blush | 9 |

EXAMPLE 3

PVC coating formulations were prepared as described in Example 1, but using other water-dilutable resins or mixtures of water-dilutable resins. The water-dilutable resins were neutralized with the stoichiometric amount of dimethyl ethanolamine unless epoxy was present. In those combinations neutralization with ammonium hydroxide was employed. The resins so used and the ratio of PVC:water-dilutable resin or mixture of resins (PVC:resin ratio) were as follows:

Acrylic — Copolymer of 90 parts ethyl methacrylate/ 10 parts acrylic acid. PVC:resin ratio = 2.5:1.

Acrylic/aminoplast — 1/0.25 mixture of above acrylic copolymer/hexamethoxymethylmelamine. PVC:resin ratio = 3.125:1.25.

Acrylic/epoxy — 1/0.5 mixture of above acrylic copolymer/diglycidyl ether of bisphenol A having 185–192 epoxide equivalent weight. PVC:resin ratio = 3.75:1.5

Acrylic/epoxy/phenolic — 1/0.5/0.5 mixture of above acrylic copolymer/diglycidyl ether of bisphenol A having 185–192 epoxide equivalent weight/50 parts phenol — 50 parts o-cresol reacted with formaldehyde. PVC:resin ratio = 5:2.

Vinyl copolymer — copolymer of 1 part maleic anhydride/86 parts vinyl chloride/13 parts vinyl acetate. PVC:resin ratio = 2.5:1.

Vinyl copolymer/aminoplast — 1/0.25 mixture of above vinyl copolymer/hexamethoxymethylmelamine. PVC:resin ratio = 3.125:1.25.

Vinyl copolymer/epoxy — 1/0.5 mixture of above vinyl copolymer/diglycidyl ether of bisphenol A having 185–192 epoxide equivalent weight. PVC:resin ratio = 3.75:1.5.

Vinyl copolymer/epoxy phenolic — 1/0.5/0.5 mixture of above vinyl copolymer/diglycidyl ether of bisphenol A having 185–192 epoxide equivalent weight/50 parts phenol — 50 parts o-cresol reacted with formaldehyde. PVC:resin ratio = 5:2.

Oleoresin — maleic anhydride reacted with woodbase resin cooked with China wood oil. PVC:resin ratio = 2.5:1.

Each formulation was evaluated for dry adhesion and pasteurized adhesion and blush. Each showed results of the magnitude of the results set forth in the Table.

A preferred water-soluble resin is an acrylic of 70/20/10 parts by weight methyl methacrylate/ethyl acrylate/acrylic acid composition. The following examples illustrate typical recipes for such compositions and their use in reverse roll coat and spray application.

EXAMPLE 4

Use suitable glass or stainless steel reactor equipped with heating and cooling capabilities, an agitator, nitrogen blanketing source and a charging line for monomer addition.

In a separate container blend 35 pounds methyl methacrylate, 10 pounds ethyl acrylate and 5 pounds acrylic acid. Stir until uniform then add 0.5 pound benzoyl peroxide and stir until peroxide is dissolved. This premix should be kept below 77° F. to prevent prereaction.

Charge to the reactor 33.7 pounds ethylene glycol monobutyl ether. Start agitation and nitrogen flow. Heat to 95°–100° C. and start mixed monomer addition at a rate that will give complete addition in three hours. Maintain the temperature at 95°–100° C. throughout the reaction. When all monomer is added, hold an additional thirty minutes at temperature and sample for conversion. Degree of conversion is measured by solids determination using at 0.5 gram sample diluted with 10 ml. of 0.1% hydroquinone in MEK and force dried 10 minutes at 400° F. When a conversion of at least 98% is obtained hold an additional thirty minutes then add 3.4 pounds ethylene glycol monobutyl ether and 12.4 pounds diethylene glycol monobutyl ether. Stir until uniform, cool to 70° C. and discharge to storage container.

The resultant product is a 50% solids acrylic resin having an acid number of 76–78, a Gardner-Holdt viscosity of > Z-8 and a weight per gallon of 8.65–8.70.

This polymer is used as the carrier for PVC resins and when crosslinked with a substituted melamine has application as a coil coating on metals from which can ends can be fabricated and as a spray coating for lining metal cans. The finished formulations and these uses are illustrated below.

EXAMPLE 5

To a suitable mixing vessel charge 10 parts of the resin solution of Example 4 and 9 parts of ethylene glycol monobutyl ether. Stir until uniform. Add 1 part of 26° Baume ammonium hydroxide. Stir until uniform. Under strong agitation add 40 parts of deionized water and stir until uniform. Under milder agitation slowly add 40 parts of PVC resin and stir until uniform.

The above entire mixture is then cycled through a dispersion mill such as a sandgrinder until a Hegman fineness of 7 minimum is obtained. This usually requires two passes. For optimum dispersion a temperature range of 100°–140° F. should be maintained during the grind.

The product is a uniform material at 45% solids having a viscosity of approximately 25 seconds #4 Ford Cup at 80° F., a weight per gallon of 9.42–9.48 pounds and a pH of 9.0–9.4.

EXAMPLE 6

Under mild agitation blend 100 parts of the product of Example 5, 2 parts of hexamethoxy methyl melamine and 1 part of ethylene glycol monohexyl ether.

This finish has essentially the same physical constants as the product of Example 5.

When applied on aluminum coil stock by reverse roll coat at a film weight of 2–3 mg./sq. in. and baked 6 seconds at 65°–750° F. perfect pasteurization resistance (wet adhesion and blush resistance) after a 45 minute immersion in 170° F. water is obtained. Adequate fabrication to permit production of can ends having clear, high gloss films is also demonstrated. These films are also satisfactory for use in contact with beer that contains the preservative n-heptyl p-hydroxy benzoate.

For spray application in cans the high solids coating of Example 6 deposits too heavy a film and does not atomize properly. However, spray viscosities are normally in the range of 25 seconds #4 Ford Cup such as Example 3 now has.

Two methods of getting lower solids at the same viscosity are:
(1) Increasing the acrylic resin content so that the final PVC/other resin ratio is about 1/1.
(2) Using a higher viscosity (higher MW) acrylic resin and maintaining about 5/1 PVC/other resin ratio.

EXAMPLE 7

Under mild agitation stir together 16.1 pounds resin solution of Example 4, 26.5 pounds of the product of Example 5, 1.6 pounds of 26° Baume ammonium hydroxide, 48.5 pounds of deionized water, 2.7 pounds of iso-octyl alcohol, 0.7 pound of ethylene glycol monohexyl ether, 1.7 pounds of ethylene glycol monobutyl ether, 2.0 pounds of hexamethoxy methyl melamine and 0.2 pound of a silicone resin flow control additive at 50% solids in ethylene glycol monobutyl ether.

The resultant product is a ready-to-spray finish at 22% total solids having a weight per gallon of 8.70–8.80 pounds and a viscosity of approximately 25 seconds #4 Ford Cup at 80° F.

Spray application on drawn and ironed aluminum cans at 120–180 mg. of coating per can yielded film properties acceptable for use as beverage containers after a bake of 2 minutes at 400° F.

The coating formulations of this invention are particularly adaptable for interior coating of metal containers for beverages, such as beer, carbonated soft drinks, noncarbonated soft drink, and fruit juices. Thus, this invention also provides a metal container having its interior surface coated with the coating composition of this invention.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A water-based coating formulation consisting essentially of powdered polyvinyl chloride dispersed in a solution of a water-dilutable resin, having functional carboxyl or hydroxy groups, selected from the group consisting of an alkyd resin, an acrylic resin, a mixture of an acrylic resin and an aminoplast, a mixture of an acrylic resin and a 1,2-epoxy resin, and a mixture of an acrylic resin, a 1,2-epoxy resin, and a phenolic resin, water-solubilized with ammonia, NH$_4$OH or an amine solubilizer, in water, a mixture of water and an alcohol or ether alcohol, or a mixture of water, alcohol, and ether alcohol; the weight ratio of polyvinyl chloride to water-dilutable resin being between 15:1 and about 1:1.

2. The formulation of claim 1, wherein said water-dilutable resin is an alkyd resin.

3. The formulation of claim 1, wherein said water-dilutable resin is an acrylic resin.

4. The formulation of claim 1, wherein said water-dilutable resin is a mixture of an acrylic resin and an aminoplast.

5. The formulation of claim 1, wherein said water-dilutable resin is a mixture of an acrylic resin and a 1,2-epoxy resin.

6. The formulation of claim 1 wherein said water-dilutable resin is a mixture of an acrylic resin, a 1,2-epoxy resin, and a phenolic resin.

7. The formulation of claim 2, wherein said alkyd resin is a polyester of tall oil fatty acids, isophthalic acid, dimethylolpropane, and trimellitic anhydride; and said amine is dimethylethanolamine.

8. The formulation of claim 3, wherein said acrylic resin is a copolymer of 70 parts methyl methacrylate, 20 parts ethyl acrylate and 10 parts acrylic acid; and said solubilizer is $NH_4OH$.

9. The formulation of claim 4, wherein said acrylic resin is a copolymer of 90 parts ethyl methacrylate and 10 parts acrylic acid; said aminoplast is hexamethoxymethylmelamine; and said amine is dimethylethanolamine.

10. The formulation of claim 5, wherein said acrylic resin is a copolymer of 90 parts ethylmethacrylate and 10 parts acrylic acid; said 1,2-epoxy resin is a diglycidyl ether of bisphenol A having an epoxide equivalent weight of 185–192; and said solubilizer is $NH_4OH$.

11. The formulation of claim 6, wherein said acrylic resin is a copolymer of 90 parts ethyl methacrylate and 10 parts acrylic acid; said 1,2-epoxy resin is a diglycidyl ether of bisphenol A having an epoxide equivalent weight of 185–192; said phenolic resin is 50 parts phenol and 50 parts o-cresol reacted with formaldehyde; and said solubilizer is $NH_4OH$.

* * * * *

UNITED STATES PATENT AND TRADEMARK OFFICE
CERTIFICATE OF CORRECTION

PATENT NO. : 4,116,905
DATED : September 26, 1978
INVENTOR(S) : KENNETH G. DAVIS It is certified that error appears in the above-identified patent and that said Letters Patent are hereby corrected as shown below:

Col. 5 line 57 "65° - 750°F." should read --650° - 750°F.--

Signed and Sealed this

Twenty-seventh Day of March 1979

[SEAL]

Attest:

RUTH C. MASON
Attesting Officer

DONALD W. BANNER
Commissioner of Patents and Trademarks